United States Patent [19]
Post

[11] Patent Number: 4,579,476
[45] Date of Patent: Apr. 1, 1986

[54] DRIVE SHAFT COUPLING MECHANISM WITH SAFETY LATCH

[75] Inventor: Alexander Post, Neunkirchen-S., Fed. Rep. of Germany

[73] Assignee: Jean Walterscheid GmbH, Fed. Rep. of Germany

[21] Appl. No.: 656,771

[22] Filed: Oct. 1, 1984

[30] Foreign Application Priority Data

Oct. 18, 1983 [DE] Fed. Rep. of Germany ....... 3337797

[51] Int. Cl.⁴ .................... B25G 3/18; F16B 21/00
[52] U.S. Cl. .................................. 403/322; 403/328
[58] Field of Search ............... 403/321, 322, 325, 326, 403/327, 328

[56] References Cited

U.S. PATENT DOCUMENTS

| | | | |
|---|---|---|---|
| 3,480,310 | 11/1969 | McElwain | 403/322 |
| 3,747,966 | 7/1973 | Wilkes | 403/322 |
| 4,318,630 | 3/1982 | Herchenbach | 403/322 |

*Primary Examiner*—Andrew V. Kundrat
*Attorney, Agent, or Firm*—Toren, McGeady, Stanger, Goldberg & Kiel

[57] ABSTRACT

A mechanism for coupling a drive shaft with a coupling sleeve in torque transmitting engagement wherein locking elements are radially movable within radial apertures of the coupling sleeve and engage within an annular groove of the drive shaft and wherein a locking sleeve is movable between two axial positions on the coupling sleeve to hold the locking members in engagement within the annular groove and to release the holding members from locking engagement, the coupling sleeve being latched in the released position by a latching mechanism which is unlatched when the drive shaft is inserted to within the coupling sleeve to drive the locking elements radially outwardly against the latching mechanism which is held in the unlatched position during coupling of the drive elements. The locking elements are held when engaged within the annular groove of the drive shaft at a radial position which is a further distance from the longitudinal axis of the coupling sleeve than the position which they assume when engaged within the annular groove.

7 Claims, 4 Drawing Figures

DRIVE SHAFT COUPLING MECHANISM WITH SAFETY LATCH

The present invention relates generally to drive shaft coupling mechanisms and more particularly to a mechanism for connecting together the power takeoff shaft of a tractor and the drive shaft of an agricultural implement.

The invention is particularly directed toward a coupling mechanism including a latching device for holding the coupling mechanism in the open position.

Devices of the type to which the present invention relates generally involve a plurality of locking members in the form of spherical balls which are radially guided in radial apertures of a coupling sleeve comprising one of the coupled members, for example, the driven shaft of an agricultural implement. The other member to be coupled may constitute the drive shaft which may be the power takeoff shaft of the tractor and which comprises an annular groove within which the locking members engage in order to axially hold the coupled members together in torque transmitting engagement. A locking sleeve axially movable on the coupling sleeve may operate to lock the balls in engagement within the annular groove to hold the mechanism in the engaged position with the locking sleeve being movable axially to enable disengagement of the balls or locking members.

In a prior art device disclosed in U.S. Pat. No. 3,747,966, there is disclosed a coupling mechanism wherein the mechanism may be latched in the open position, the mechanism having an arresting ring which, by means of a key button, can be positioned eccentrically relative to the axis of the coupling sleeve, which engages eccentrically into a groove of the coupling sleeve, and which, via blocking members effecting the axial locking of the coupling sleeve on a power takeoff shaft of a tractor, is moved from the arrested position into the released position coaxial to the coupling sleeve when the blocking members come into contact with the power takeoff shaft.

The disadvantage of such a prior art design is that the drawing lock can be moved into the arrested open position when the coupling sleeve is in the secured position on the power takeoff shaft. This may happen quite unintentionally through contact with the outer ring in connection with the key button so that the coupling sleeve is no longer axially secured on the shaft. There is a great risk of accidents if the coupling sleeve arranged at the end of a drive shaft slides off the power takeoff shaft.

Accordingly, the present invention is directed toward providing a latching mechanism or drawing lock which may be arrested in the open position, and which, for the purpose of eliminating the arresting effect, is controlled directly by the locking members, the mechanism being such that it cannot be moved into the arrested position when the coupling sleeve is slipped over the power takeoff shaft and secured against axial movement.

SUMMARY OF THE INVENTION

Briefly, the present invention may be described as a drive shaft coupling mechanism particularly for coupling the driven shaft of an agricultural implement to the power takeoff shaft of a tractor comprising: a driving and a driven member, one of said members being a coupling sleeve defining a longitudinal axis and having radial apertures therein and the other of said members being axially engageable with and disengageable from said coupling sleeve and having an annular groove therein; means interposed between said driving and driven members for effecting torque transmission therebetween when said members are axially engaged; locking elements radially movable within said radial apertures engageable within said annular groove for axially locking said members in torque transmitting engagement; a locking sleeve axially movable on said coupling sleeve to a first axial position locking said locking elements in engagement within said annular groove and to a second axial position allowing said locking elements to move within said radial apertures out of engagement within said annular groove; latch means latching said locking sleeve in said second axial position, said latch means being released by radial movement of said locking elements within said radial apertures caused by engagement thereof with said other member when said other member is inserted into said coupling sleeve; and stop means within said radial apertures limiting the radially innermost position of said locking elements when said driving and driven members are disengaged; said locking elements being held within said annular groove when said driving and driven members are in the engaged position at a radial position which is a greater distance from said longitudinal axis of said coupling sleeve than said radially innermost position when said driving and driven members are disengaged.

Thus, in accordance with the invention, the objectives thereof are achieved in that, in the engaged position causing the locking effect, the locking elements are held in the annular groove of the power takeoff shaft at a radial distance from the longitudinal axis of the coupling sleeve which is greater than the inwardly pointing free radial travel of the locking elements with the coupling sleeve removed from the power takeoff shaft.

The advantage of the drawing lock in accordance with the invention is that without utilizing any additional key buttons, it is ensured that arresting of the drawing lock in the open position can only be effected when the coupling sleeve is pulled off the power takeoff shaft and that the locking effect is eliminated immediately when the locking elements come into contact with the outer stop of the power takeoff shaft. The design in accordance with the present invention does not require an additional key button or control pin which, in turn, would require an additional bore.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE PREFERRED EMBODIMENT

Figure 1:
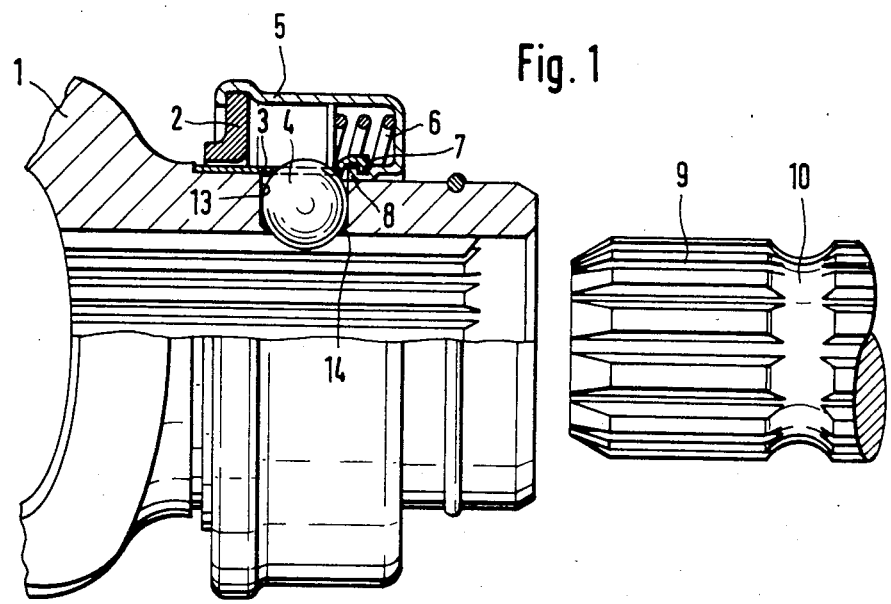
FIG. 1 is a sectional view showing a coupling mechanism in accordance with the present invention in the disengaged position.
Figure 2:
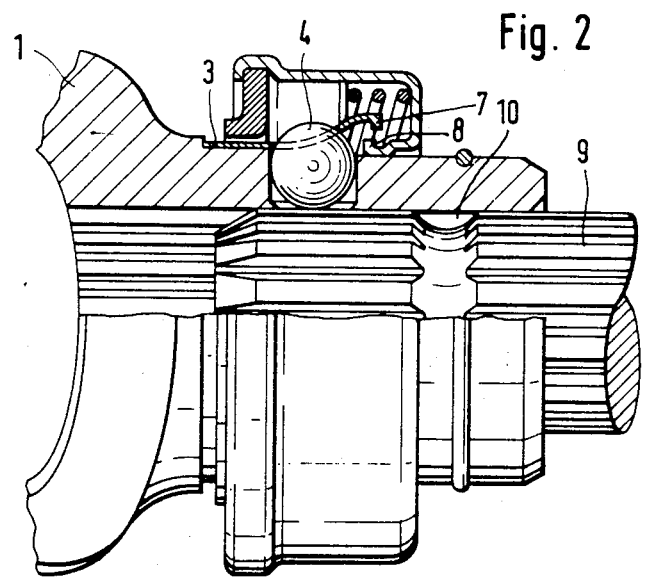
FIG. 2 is a sectional view illustrating the coupling mechanism during engagement of the coupling members thereof.

Referring now to the drawings wherein similar reference numerals are used to identify similar parts throughout the various figures thereof, there is shown a coupling mechanism for a drive shaft assembly wherein a coupling sleeve 1, which may comprise the driven member of an agricultural implement, is adapted to be coupled with a driving member 9, which may comprise the power takeoff shaft of a tractor. The coupling sleeve 1 is formed with internal splines which engage external splines on the driving member 9 in order to place the members in torque transmitting driving engagement. In FIG. 1, the elements 1 and 9 are shown in the disengaged position. In FIG. 2, the elements are shown in the process of bringing the members 1 and 9 into the engaged or torque transmitting position and, in FIG. 3, there is shown the fully engaged, axially secured torque transmitting condition of the members.

The assembly includes a locking ring 2 which is formed together with an annular member 5 defining a spring chamber, the locking ring or sleeve 2 being axially movable together with the member 5 on the coupling sleeve 1.

Figure 4:
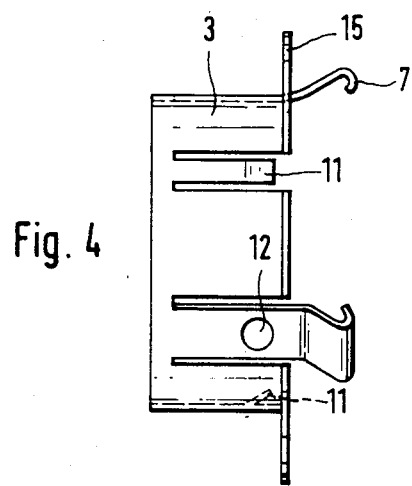
FIG. 4 is a lateral view of the latch means of the invention.

The latching means of the invention comprise an annular latching member 3 which is affixed onto the coupling sleeve 1 and which is shown in greater detail in FIG. 4.

Figure 3:
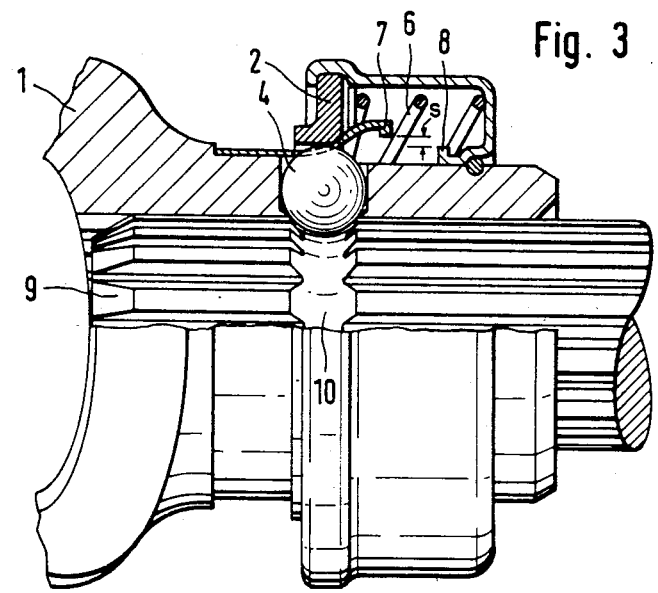
FIG. 3 is a sectional view showing the engaged position of the members of the, coupling mechanism.

Locking elements 4 in the form of spherical balls operate to engage within an annular groove 10 of the driving member 9 in order to lock the members 1 and 9 in axially secured position as shown in FIG. 3 so that they may be engaged for torque transmission therebetween.

The latching means comprised of the annular member 3 include a plurality of latching hooks 7 each having an aperture 12 therein. The coupling sleeve 12 is formed with radially extending apertures 13 within which the locking elements 4 are radially movable. Stop means 14 operate to limit the radially innermost position of the locking elements 4 within the radial apertures 13.

The locking sleeve, which is comprised of the locking ring 2 and the spring chamber 5, is formed with a circumferential latching groove 8 within which the hooks 7 may engage when the coupling mechanism is in the disengaged position shown in FIG. 1.

A spring member 6 is provided within the spring chamber member 5.

When the coupling sleeve 1 is disengaged from the power takeoff shaft or driving member 9, as shown in FIG. 1, the locking sleeve formed by the locking ring 2 and the spring chamber member 5, which are joined together to form a single unit, will be moved manually against the force of the spring 6 in the direction opposite to the direction in which the coupling sleeve is slipped on to the power takeoff shaft. On account of the spring force of the latching hooks 7 provided on the annular latching member 3, the locking elements 4 are pushed against stops 14 best seen in FIG. 4, formed on the latching ring 3. Thus, the latching hooks 7 provided on the latching ring 3 push the locking elements 4 on which each of them is supported via an aperture 12 against the stops 14 in the apertures 13 of the coupling sleeve 1 radially inwardly against the stops 14. In this position, the latching hooks 7 are capable of engaging into the circumferential groove 8 provided in the spring chamber member 5 and via the spring chamber member 5 hold the locking ring 2 in the latched or arrested open position.

When the coupling sleeve 1 is slipped on to the power takeoff shaft 9, the locking elements 4 are pushed radially outwardly by the power takeoff shaft 9 so that the latching hooks 7 lift out of the circumferential groove 8 of the spring chamber member 5 thereby releasing the arrested or latching open position (FIG. 2).

As previously indicated, FIG. 3 shows the axially secured position of the coupling sleeve 1 on the power takeoff shaft or driving member 9. The locking elements 4 are engaged within the circular groove 10 of the power takeoff shaft 9 and they are held in the locked position by the locking ring 2 on account of the force of the spring 6 which, at its end facing the locking ring, is supported on radial brackets 15 of the arresting ring 3.

In this position, the locking elements 4 cannot give way in the apertures 13 until they come into contact with the stops 14, but are held in the annular groove 10 in a radially more outward position. This means that the latching hooks 7 cannot engage in the circumferential groove 8 of the spring chamber member 5 and they are firmly held by the edge of the circumferential groove 8 at a radial distance.

Even an unintentional transfer of the latching mechanism into the open position causes it to snap straight back into the locked position. Because of the dimension "S" which occurs (see FIG. 3), arresting in this open position is not possible.

FIG. 4 illustrates the latching or arresting ring with the latching hooks 7 having apertures 12 for providing support on the locking elements 4, the radial brackets 15 and positioning claws 11 which engage into additional bores of the coupling sleeve 1 to secure the latching ring against rotation.

Thus, it will be seen that the present invention provides a drawing lock or latching mechanism which is capable of being latched in the open position, which is controlled directly by the locking elements without the need for additional key buttons or control members and which, with the coupling sleeve secured on the power takeoff shaft against axial movement, cannot be transferred into the arrested or latching position as this might cause accidents.

In accordance with the invention, the objectives thereof are achieved in that the locking elements are held in the engaged position in the annular groove of the power takeoff shaft at a radial distance from the longitudinal axis of the coupling sleeve which is greater than the inwardly pointing radial free travel of the locking elements when the coupling sleeve is pulled off the power takeoff shaft.

As indicated in the drawing, the latching means which comprise the annular latching ring 3 and the latching hooks 7 operate to apply a radially inwardly directed force against the locking elements 4 when the coupling mechanism is in the open position shown in FIG. 1 with the latching means in the latched position. The latching hooks 7 operate as a spring member which is adapted to engage the locking sleeve to hold the locking sleeve in its unlocked position shown in FIG. 1 and the spring means 6 are interposed between the coupling sleeve 1 and the locking sleeve 2, 5 to bias the locking sleeve toward the locked position shown in FIG. 3. The latching sleeve 3 is affixed to the coupling sleeve 1 and, thus, the spring element 6 may engage between the spring chamber member 5 and the radial brackets 15 of the latching sleeve 3 in order to apply the spring force tending to bias the locking sleeve 2, 5 toward the locking position.

Thus, as a result of the fact that the locking elements operate when the coupling mechanism is in the engaged position to be located radially further away from the central axis of the coupling sleeve 1 than when the coupling mechanism is in the engaged condition, the latching or arresting effect is controlled directly by the locking elements and the latching mechanism cannot be moved into the latching or arrested position when the coupling sleeve is attached in engaged position on the power takeoff shaft and secured against axial movement.

While a specific embodiment of the invention has been shown and described in detail to illustrate the application of the inventive principles, it will be understood that the invention may be embodied otherwise without departing from such principles.

What is claimed is:

1. A drive shaft coupling mechanism particularly for coupling the driven shaft of an agricultural implement to the power takeoff shaft of a tractor comprising:

a driving and a driven member, one of said members being a coupling sleeve defining a longitudinal axis and having radial apertures therein and the other of said members being axially engageable with and disengageable from said coupling sleeve and having an annular groove therein;

means interposed between said driving and driven members for effecting torque transmission therebetween when said members are axially engaged;

locking elements radially movable within said radial apertures engageable within said annular groove for axially locking said members in torque transmitting engagement;

a locking sleeve axially movable on said coupling sleeve to a first axial position locking said locking elements in engagement within said annular groove and to a second axial position allowing said locking elements to move within said radial apertures out of engagement with said annular grooves;

spring latching means latching said locking sleeve in said second axial position, said latching means being released by radial movement of said locking elements within said radial apertures caused by engagement thereof with said other member when said other member is inserted into said coupling sleeve; and stop means within said radial apertures limiting the radially innermost position of said locking elements when said driving and driven members are disengaged;

said locking elements being held within said annular groove when said driving and driven members are in the engaged position at a radial position which is a greater distance from said longitudinal axis of said coupling sleeve than said radially innermost position when said driving and driven members are disengaged.

2. A mechanism according to claim 1, wherein said latching means tends to apply a radially inwardly directed force against said locking elements when in the latched position.

3. A mechanism according to claim 1, wherein said latching means comprise a spring member adapted to engage with said locking sleeve to hold said locking sleeve in said second position.

4. A mechanism according to claim 3, wherein said locking elements tend to hold said spring member out of engagement with said locking sleeve when said driving and driven members are in torque transmitting engagement.

5. A mechanism according to claim 1 including spring means interposed between said coupling sleeve and said locking sleeve biasing said locking sleeve towards the first position.

6. A mechanism according to claim 4, wherein said latching means is affixed to said coupling sleeve and said spring means is engaged between said latching means and said locking sleeve.

7. A mechanism according to claim 3, wherein said spring member tends to apply a radially inwardly directed force against said locking elements when in engagement with said locking sleeve.

* * * * *